(12) United States Patent
Lin

(10) Patent No.: US 10,534,462 B2
(45) Date of Patent: Jan. 14, 2020

(54) DISPLAY SCREEN ASSEMBLY, MANUFACTURING METHOD THEREOF AND ELECTRONIC DEVICE

(71) Applicant: GUANGDONG OPPO MOBILE TELECOMMUNICATIONS CORP., LTD., Dongguan (CN)

(72) Inventor: Yugui Lin, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 358 days.

(21) Appl. No.: 15/688,666

(22) Filed: Aug. 28, 2017

(65) Prior Publication Data

US 2018/0196559 A1 Jul. 12, 2018

(30) Foreign Application Priority Data

Jan. 9, 2017 (CN) .......................... 2017 1 0013734
Jan. 9, 2017 (CN) ..................... 2017 2 0024309 U

(51) Int. Cl.
*G06F 1/16* (2006.01)
*H05K 5/00* (2006.01)
(Continued)

(52) U.S. Cl.
CPC ........ *G06F 3/0412* (2013.01); *G02F 1/13338* (2013.01); *G06F 1/1626* (2013.01);
(Continued)

(58) Field of Classification Search
CPC .... G06F 1/1626; G06F 1/1601; G06F 1/1613; G06F 1/1615; G06F 1/1616;
(Continued)

(56) References Cited

U.S. PATENT DOCUMENTS 6,400,571 B1 *  6/2002  Kimura ..................... G06F 1/18
                                                           165/185
9,513,668 B2 * 12/2016  Shin ........................ G06F 3/041
(Continued)

FOREIGN PATENT DOCUMENTS

CN          202872874 U     4/2013
CN          103116229 A     5/2013
(Continued)

OTHER PUBLICATIONS

Chinese Patent Application No. 201710013734.7, Office Action dated Sep. 4, 2018, 9 pages.
(Continued)

*Primary Examiner* — Anthony M Haughton
(74) *Attorney, Agent, or Firm* — Lathrop Gage LLP

(57) ABSTRACT

The present disclosure relates to a display screen assembly, an electronic device and a manufacturing method of the display screen assembly. The display screen assembly includes a bracket, a display screen, a cover plate and a decoration enclosure. The bracket includes a bottom wall and a side wall. The display screen includes a top surface and a bottom surface provided on the bottom wall. The display screen and the side wall are located at two opposite sides of the bottom wall respectively. The bottom surface of the cover plate is joined with the top surface of the display screen. The cover plate has a groove at a side wall thereof. The decoration enclosure includes a first joining part and a second joining part coupled mutually, the first joining part is received in the groove, and the second joining part is joined with the side wall of the bracket.

20 Claims, 3 Drawing Sheets

(51) Int. Cl.
*H05K 7/00* (2006.01)
*G06F 3/041* (2006.01)
*H04M 1/02* (2006.01)
*G02F 1/1333* (2006.01)
*B29C 45/14* (2006.01)

(52) U.S. Cl.
CPC ..... *H04M 1/0266* (2013.01); *B29C 45/14467* (2013.01); *G06F 2203/04103* (2013.01); *H04M 1/0283* (2013.01); *H04M 2250/22* (2013.01)

(58) Field of Classification Search
CPC ...... G06F 1/1618; G06F 1/162; G06F 1/1622; G06F 1/1624; G06F 1/1605; G06F 3/0412; G06F 3/041; H04M 1/0266; H04M 1/0268; H04M 1/027; H04M 1/026; H04M 1/0295; G02F 1/13338
USPC .............. 361/679.01, 679.02, 679.21–679.3, 361/679.55, 679.56; 455/575.1–575.9
See application file for complete search history.

(56) References Cited

U.S. PATENT DOCUMENTS

| | | | | |
|---|---|---|---|---|
| 9,578,149 | B2* | 2/2017 | Moon | H04M 1/0202 |
| 9,716,307 | B2* | 7/2017 | Tsai | H01Q 13/106 |
| 9,794,382 | B2* | 10/2017 | Yang | H04M 1/0249 |
| 10,211,515 | B2* | 2/2019 | Hwang | H01Q 1/44 |
| 2014/0125528 | A1* | 5/2014 | Tsai | H01Q 13/106 |
| | | | | 343/702 |
| 2014/0239781 | A1* | 8/2014 | Allore | B29C 45/14311 |
| | | | | 312/223.1 |
| 2015/0331451 | A1* | 11/2015 | Shin | G06F 1/1626 |
| | | | | 345/173 |
| 2016/0227654 | A1* | 8/2016 | Kim | G06F 1/16 |
| 2016/0234362 | A1* | 8/2016 | Moon | H04M 1/0202 |
| 2018/0196559 | A1* | 7/2018 | Lin | G02F 1/13338 |
| 2018/0199446 | A1* | 7/2018 | Cheng | G06F 1/1637 |

FOREIGN PATENT DOCUMENTS

| | | |
|---|---|---|
| CN | 104010458 U | 8/2014 |
| CN | 204406408 U | 6/2015 |
| CN | 104866020 A | 8/2015 |
| CN | 105022185 A | 11/2015 |
| CN | 105158951 A | 12/2015 |
| CN | 106847091 A | 6/2017 |
| CN | 206363698 U | 7/2017 |
| JP | 5654146 B2 | 1/2015 |
| WO | WO 2016169393 A1 | 10/2016 |

OTHER PUBLICATIONS

Chinese Patent Application No. 201710013734.7, English translation of Office Action dated Sep. 4, 2018, 10 pages.
European Patent Application No. 17187504.0, extended Search and Opinion dated Mar. 26, 2018, 9 pages.
PCT/CN2017/098973 English translation of International Search Report and Written Opinion dated Dec. 5, 2017, 13 pages.

* cited by examiner

DISPLAY SCREEN ASSEMBLY, MANUFACTURING METHOD THEREOF AND ELECTRONIC DEVICE

CROSS-REFERENCE TO RELATED APPLICATIONS

This application claims priority to and benefits of Chinese Patent Application Nos. 201710013734.7 and 201720024309.3, filed with State Intellectual Property Office on Jan. 9, 2017, the entire content of which is incorporated herein by reference.

FIELD

The present disclosure relates to a technical field of mobile electronic devices, particularly to a display screen assembly, an electronic device and a manufacturing method of the display screen assembly.

BACKGROUND

With developments of technologies, smartphones are used more and more widely and have more and more functions, and smartphones have become requisite electronic apparatuses in people's daily lives. At present, large-screen smartphones have a larger display area to meet a user's requirements for browsing web pages, reading books, watching videos, playing games and so on. Hence, the bezel of the smartphone is getting narrower to increase a screen-to-body ratio so as to improve the user experience. However, the narrower the bezels of the smartphones are, the greater of the difficulties of assembling a display screen and a cover plate in the smartphones.

SUMMARY

According to a first aspect of embodiments of the present disclosure, there is provided a display screen assembly. The display screen assembly includes a bracket, a display screen, a cover plate and a decoration enclosure. The bracket includes a bottom wall and a side wall bending from the bottom wall. The display screen includes a top surface and a bottom surface, the bottom surface of the display screen is provided on the bottom wall of the bracket, and the display screen and the side wall of the bracket are located at two opposite sides of the bottom wall of the bracket respectively. A bottom surface of the cover plate is joined with the top surface of the display screen, and the cover plate has a groove at a side wall thereof. The decoration enclosure includes a first joining part and a second joining part coupled to each other, the first joining part is received in the groove, and the second joining part is joined with the side wall of the bracket.

According to a second aspect of embodiments of the present disclosure, there is provided an electronic device. The electronic device includes a display screen assembly and a rear cover coupled to the display screen assembly. The display screen assembly includes a bracket, a display screen, a cover plate and a decoration enclosure. The bracket includes a bottom wall and a side wall bending from the bottom wall. The display screen includes a bottom surface provided on the bottom wall of the bracket, and the display screen and the side wall of the bracket are located at two opposite sides of the bottom wall of the bracket respectively. A bottom surface of the cover plate is joined with a top surface of the display screen, and the cover plate has a groove at a side wall thereof. The decoration enclosure includes a first joining part received in the groove and a second joining part joined with the side wall of the bracket.

According to a third aspect of embodiments of the present disclosure, there is provided a manufacturing method of a display screen assembly. The manufacturing method includes:

providing a decoration enclosure, a cover plate, a display screen and a bracket;

in-mold injection-molding the decoration enclosure and the cover plate to couple the decoration enclosure to the cover plate fixedly, in which the cover plate has a groove at a side wall thereof, the decoration enclosure includes a first joining part and a second joining part coupled to each other, and the first joining part is received in the groove;

laminating a top surface of the display screen with a bottom surface of the cover plate fully;

coupling a side wall of the bracket to the decoration enclosure fixedly, and arranging a bottom wall of the bracket under the display screen.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and readily appreciated from descriptions made with reference to following drawings.

DETAILED DESCRIPTION

Figure 1:
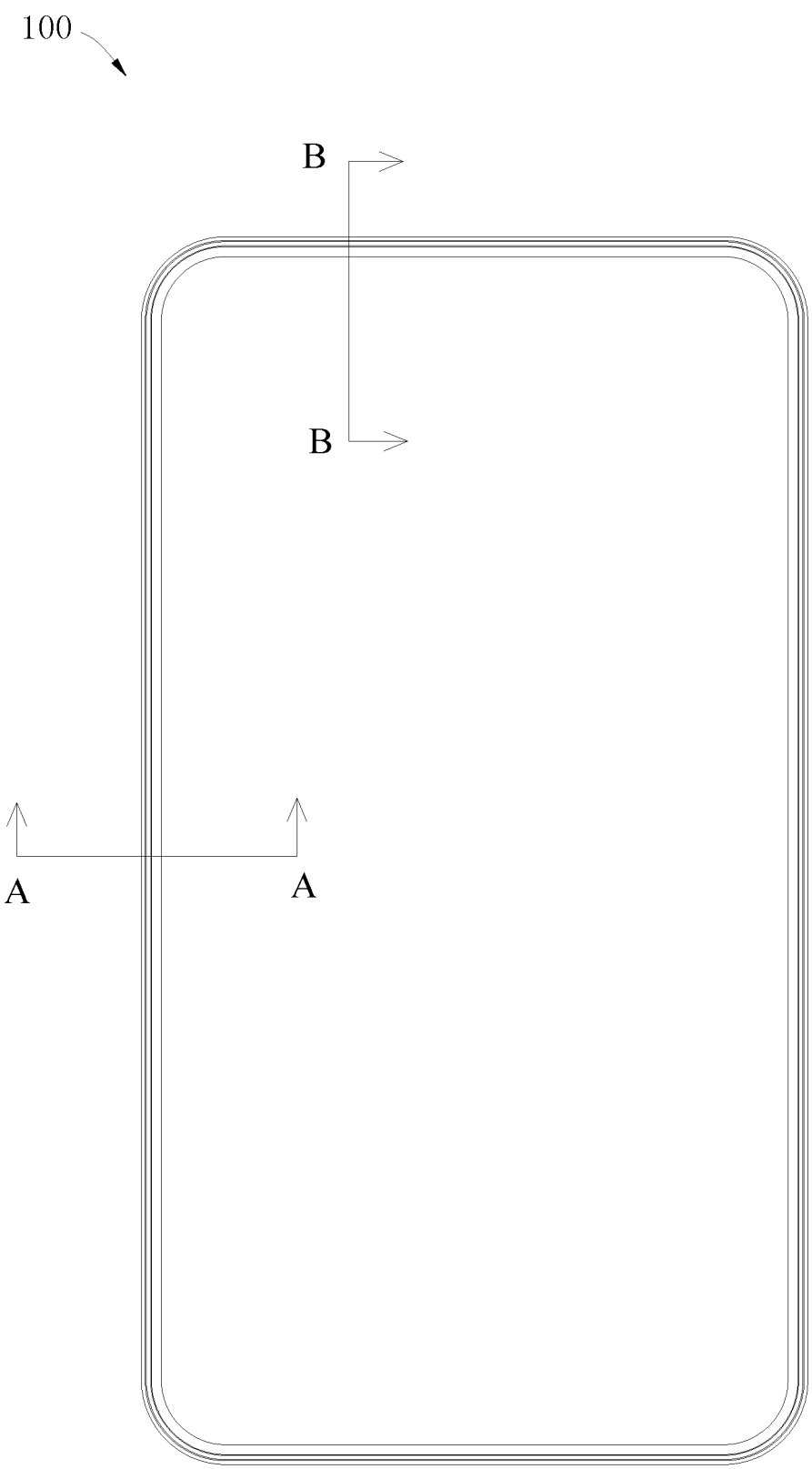
FIG. 1 illustrates a plan view of an electronic device according to an embodiment of the present disclosure.

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" means two or more than two, unless specified otherwise.

In the present disclosure, unless specified or limited otherwise, the terms "mounted", "connected", "coupled", "fixed" and the like are used broadly, and can be, for example, fixed connections, detachable connections, or integral connections; can also be mechanical or electrical connections; can also be direct connections or indirect connections via intervening structures; can also be inner communications of two elements. The above terms can be understood by those skilled in the art according to specific situations.

In the description of the present disclosure, a structure in which a first feature is "on" a second feature can include an embodiment in which the first feature directly contacts the second feature, and can also include an embodiment in which an additional feature is formed between the first feature and the second feature, so that the first feature does not directly contact the second feature, unless otherwise specified. Furthermore, a first feature "on", "above" or "on top of" a second feature can include an embodiment in which the first feature is right "on", "above" or "on top of" the second feature, and can also include an embodiment in which the first feature is not right "on", "above" or "on top of" the second feature, or just means that the first feature has a sea level elevation larger than the sea level elevation of the second feature. While first feature "beneath", "below" or "on bottom of" a second feature can include an embodiment in which the first feature is right "beneath", "below" or "on bottom of" the second feature, and can also include an embodiment in which the first feature is not right "beneath", "below" or "on bottom of" the second feature, or just means that the first feature has a sea level elevation smaller than the sea level elevation of the second feature.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters can be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

Figure 2:
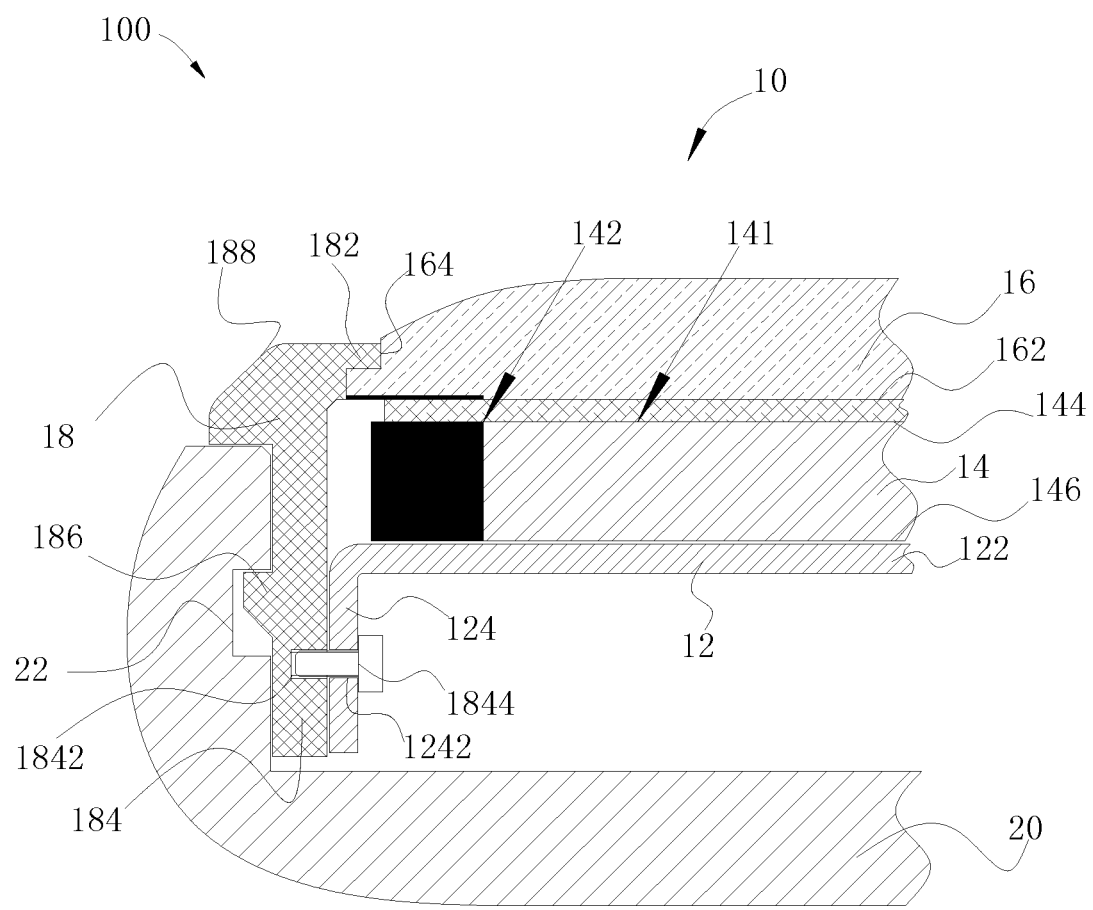
FIG. 2 illustrates a sectional view of the electronic device taken along line A-A and/or line B-B in FIG. 1.

As illustrated in FIG. 1 and FIG. 2, an electronic device 100 according to embodiments of the present disclosure includes a display screen assembly 10, and a rear cover 20. The electronic device 100 can be a mobile phone, a tablet computer, a smart watch or the like.

In some embodiments, the display screen assembly 10 is configured to display images, texts and so on. Moreover, the display screen assembly 10 can also be configured to receive a touch operation of a user. The display screen assembly 10 includes a bracket 12, a display screen 14, a cover plate 16 and a decoration enclosure 18.

The bracket 12 includes a bottom wall 122 and a side wall 124 bending from the bottom wall 122. In embodiments of the present disclosure, the bottom wall 122 and the side wall 124 are perpendicular to each other, and four side walls 124 are provided, in other words, the side walls 124 extend from four sides of the bottom wall 122 respectively. In other embodiments, the bottom wall 122 may not be perpendicular to the side wall 124. The bracket 12 can be made of metal materials, such as steel, aluminum alloy, or magnesium alloy. The bracket 12 can also be made of nonmetal materials, such as acrylonitrile-butadiene-styrene copolymer (ABS), polyvinyl chloride (PVC) or polycarbonate (PC). The material of the bracket 12 is not limited to the materials mentioned above, and an appropriate material can be selected according to requirements in a practical application.

The display screen 14 includes a top surface 144 and a bottom surface 146. The bottom surface 146 of the display screen 14 is provided on the bottom wall 122 of the bracket 12, and the bottom surface 146 of the display screen 14 can be joined to the bottom wall 122 in an adhering manner. In some embodiments of the present disclosure, a layer of foam adhesive or double sided adhesive can be padded between the bottom surface 146 of the display screen 14 and the bottom wall 122 of the bracket 12 according to requirements. In some embodiments of the present disclosure, a gap can be retained between the bottom surface 146 of the display screen 14 and the bottom wall 122 of the bracket 12 to provide a buffering space so as to protect the display screen 14 when encountering a collision. The display screen 14 and the side wall 124 are located at two opposite sides of the bottom wall 122 respectively. The display screen 14 can be configured as a liquid crystal display (LCD), an organic light-emitting diode (OLED) display screen or a flexible OLED display screen. The display screen 14 includes a display area 141 and a non-display area 142, and the display area 141 is configured to achieve a function of the display screen assembly 10 for displaying images, texts and the like.

The cover plate 16 is provided on the display screen 14. The bottom surface 162 of the cover plate 16 and the top surface 144 of the display screen 14 can be joined in a full lamination manner. In some embodiments of the present disclosure, the bottom surface 162 of the cover plate 16 and the top surface 144 of the display screen 16 can be laminated by means of an optically clear adhesive (OCA). The cover plate 16 is configured as a touch-screen cover plate. In other words, a touch control circuit of a touch screen is integrated in the cover plate 16, and a touch control function can be achieved by clicking the cover plate 16. The cover plate 16 can be made of materials such as glass, sapphire or polyvinyl chloride (PVC), etc. In some embodiments, the cover plate 16 is configured to have two layers of structures, namely a touch panel and a protection cover sheet provided on the touch panel. The touch panel includes the touch control circuit of the touch screen and is configured to achieve the touch operation of the display screen assembly 10, and the protection cover sheet is configured to protect the touch panel from being damaged due to direct touch operations on the touch panel. In other words, the cover plate 16 serves as the touch screen with better protection thereof. The cover plate 16 has a groove 164 at a side wall thereof. In some embodiments of the present disclosure, the groove 164 is configured to have a stepped shape. In other embodiments, the groove 164 can also be configured to have a recessed shape. The shape of the groove 164 is not limited herein. The bottom surface 162 of the cover plate 16 is screen-printed with a circle of black-ink edge at a periphery thereof, so as to shield the non-display area 142 and other internal structures.

The decoration enclosure 18 includes a first joining part 182 and a second joining part 184 coupled to each other. The first joining part 182 is received in the groove 164. In some embodiments of the present disclosure, the first joining part 182 is snapped in the groove 164, and the decoration enclosure 18 is joined with the cover plate 16 as a whole by in-mold injection molding. In some embodiments of the present disclosure, the first joining part 182 is configured to have a stepped shape matched the shape of the groove 164. In other embodiments, the first joining part 182 can also be configured to have another shape matched the shape of the groove 164, as long as the first joining part 182 can be fitted with and coupled to the groove 164. The second joining part 184 is joined with the side wall 124. In embodiments of the present disclosure, the second joining part 184 has a threaded hole 1842 at an inner side thereof, the side wall 124 has a coupling through-hole 1242 at a position corresponding to the threaded hole 1842, the coupling through-hole 1242 is threaded and the second joining part 184 is joined to the side wall 124 through a screw 1844. In some embodiments of the present disclosure, the screw 1844 passes through the coupling through-hole 1242 and is screwed into the threaded hole 1842 of the second joining part 184 so as to fasten the second joining part 184 with the side wall 124. In other embodiments, the second joining part 184 can be joined with the side wall 124 by one or a combination of several ones of adhering, screwing, snapping and welding. In some embodiments, the second joining part 184 can be joined with the side wall 124 by selecting an appropriate coupling manner according to practical requirements. The coupling manner between the second joining part 184 and the side wall 124 is not limited herein. An outer wall 188 of the decoration enclosure 18 is configured to have an arc shape. In other embodiments, the outer wall 188 of the decoration enclosure 18 is not limited to having the arc shape, but can also be configured to have other shapes. In some embodiments of the present disclosure, the decoration enclosure 18 surrounds a periphery of the cover plate 16.

The rear cover 20 is snapped with the decoration enclosure 18. In some embodiments of the present disclosure, the decoration enclosure 18 is provided with a boss 186 at a side of the decoration enclosure 18 opposite to the threaded hole 1842, the rear cover 20 has a groove 22 corresponding to the boss 186, and the boss 186 is snapped into the groove 22 to couple the rear cover 20 with the decoration enclosure 18.

During assembling the display screen assembly 10 according to embodiments of the present disclosure, first, the decoration enclosure 18 is joined with the cover plate 16 as a whole by in-mold injection molding, and the first joining part 182 is received in the groove 164. Then, the bottom surface 162 of the cover plate 16 is fully laminated with the top surface 144 of the display screen 16 through the optically clear adhesive (OCA), so that the decoration enclosure 18, the cover plate 16 and the top surface 144 of the display screen 14 are coupled together. Finally, the bracket 12 is joined with the decoration enclosure 18, the side wall 124 of the bracket 12 is secured to the second joining part 184 of the decoration enclosure 18, and the bottom surface 146 of the display screen 14 is provided on the bottom wall 122 of the bracket 12. Thus, the display screen assembly 10 is formed.

In the display screen assembly 10 and the electronic device 100 according to embodiments of the present disclosure, since structures of the bracket 12, the display screen 14, the cover plate 16 and the decoration enclosure 18 of the display screen assembly 10 are designed reasonably, it is possible to assemble the display screen 14 and the cover plate 16 in the electronic device when a peripheral bezel of the electronic device 100 is extremely narrow, thereby solving a problem of assembling difficulties resulted from the extremely narrow bezel of the electronic device 100. Thus, the extremely narrow bezel is achieved, a screen-to-body ratio is increased, and hence the user experience is improved. The display screen assembly 10 and the electronic device 100 according to embodiments of the present disclosure have a simple structure and an easy assembling process, which facilitates improving the production efficiency and saving the production cost.

Further, the decoration enclosure 18 is coupled with the cover plate 16 as a whole by in-mold injection molding, and the first joining part 182 is received in the groove 164. This molding manner allows the decoration enclosure 18 to be fitted with the cover plate 16 better, and the groove 164 having the stepped shape allows the decoration enclosure 18 to fix the cover plate 16 in the electronic device 100 more stably. Moreover, the first joining part 182 is received in the groove 164 having the stepped shape, so that the first joining part 182 covers part of the black-ink edge of the cover plate 16, thereby reducing a width of the black-ink edge. When the user uses the electronic device 100, the black-ink edge seen by the user is narrower and more artistic, thus improving the user experience.

Figure 3:
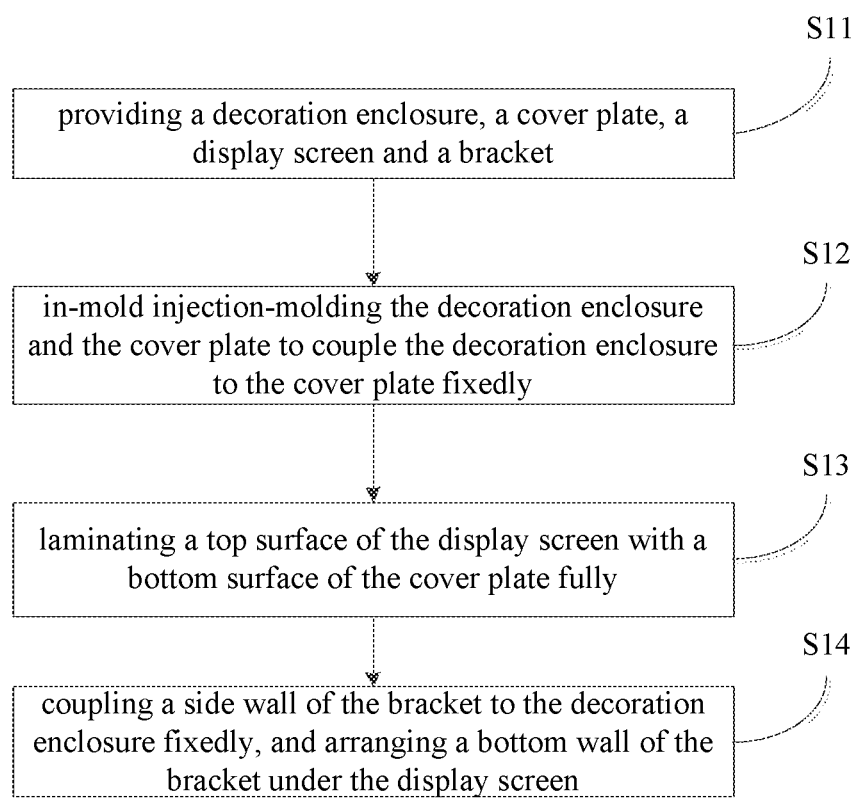
FIG. 3 illustrates a flow chart of a manufacturing method of a display screen assembly according to an embodiment of the present disclosure.

As illustrated in FIGS. 2 and 3, a manufacturing method according to embodiments of the present disclosure is configured to manufacture a display screen assembly 10. The manufacturing method includes actions at following blocks.

At block S11: a decoration enclosure 18, a cover plate 16, a display screen 14 and a bracket 12 are provided.

At block S12: the decoration enclosure 18 and the cover plate 16 are in-mold injection-molded to couple the decoration enclosure 18 to the cover plate 16 fixedly, in which the cover plate 16 has a groove 164 at a side wall thereof, the decoration enclosure 18 includes a first joining part 182 and a second joining part 184 coupled to each other, and the first joining part 182 is received in the groove 164.

At block S13: a top surface 144 of the display screen 14 is fully laminated with a bottom surface 162 of the cover plate 16.

At block S14: a side wall 124 of the bracket 12 is coupled to the decoration enclosure 18 fixedly, and a bottom wall 122 of the bracket 12 is arranged under the display screen 14.

The bracket 12 includes the bottom wall 122 and a side wall 124 bending from the bottom wall 122. In embodiments of the present disclosure, the bottom wall 122 and the side wall 124 are perpendicular to each other, and four side walls 124 are provided, in other words, the side walls 124 extend from four sides of the bottom wall 122 respectively. In other embodiments, the bottom wall 122 may not be perpendicular to the side wall 124. The bracket 12 can be made of metal materials, such as steel, aluminum alloy and magnesium alloy. The bracket 12 can also be made of nonmetal materials, such as acrylonitrile-butadiene-styrene copolymer (ABS), polyvinyl chloride (PVC), or polycarbonate (PC). The material of the bracket 12 is not limited to the materials mentioned above, and an appropriate material can be selected according to requirements in a practical application.

The display screen 14 includes the top surface 144 and a bottom surface 146. The bottom surface 146 of the display screen 14 is provided on the bottom wall 122 of the bracket 12, and the bottom surface 146 of the display screen 14 can be joined to the bottom wall 122 in an adhering manner. In some embodiments of the present disclosure, a layer of foam adhesive or double sided adhesive can be padded between the bottom surface 146 of the display screen 14 and the bottom wall 122 of the bracket 12 according to requirements. In some embodiments of the present disclosure, a gap can also be retained between the bottom surface 146 of the display screen 14 and the bottom wall 122 of the bracket 12 to provide a buffering space so as to protect the display screen 14 when encountering a collision. The display screen 14 and the side wall 124 are located at two opposite sides of the bottom wall 122 respectively. The display screen 14 can be configured as a liquid crystal display (LCD), an organic light-emitting diode (OLED) display screen or a flexible OLED display screen. The display screen 14 includes a display area 141 and a non-display area 142, and the display area 141 is configured to achieve a function of the display screen assembly 10 for displaying images, texts and the like.

The cover plate 16 is provided on the display screen 14. The bottom surface 162 of the cover plate 16 and the top surface 144 of the display screen 14 can be laminated by means of an optically clear adhesive (OCA). The cover plate 16 is configured as a touch-screen cover plate. In other words, a touch control circuit of a touch screen is integrated in the cover plate 16, and a touch control function can be achieved by clicking the cover plate 16. The cover plate 16 can be made of materials such as glass, sapphire or polyvinyl chloride (PVC), etc. In some embodiments, the cover plate 16 is configured to have two layers of structures, namely a touch panel and a protection cover sheet provided on the touch panel. The touch panel is configured to achieve the touch operation of the display screen assembly 10, and the protection cover sheet is configured to protect the touch panel from being damaged due to direct touch operations on the touch panel. The cover plate 16 has a groove 164 at a side wall thereof. In some embodiments of the present disclosure, the groove 164 is configured to have a stepped shape. In other embodiments, the groove 164 can also be configured to have a recessed shape. The shape of the groove 164 is not limited herein. The bottom surface 162 of the cover plate 16 is screen-printed with a circle of black-ink edge at a periphery thereof, so as to shield the non-display area 142 and other internal structures.

The decoration enclosure 18 includes the first joining part 182 and the second joining part 184 coupled to each other. The first joining part 182 is received in the groove 164. In at least one embodiment, the first joining part 182 is snapped in the groove 164. In some embodiments of the present disclosure, the first joining part 182 is configured to have a stepped shape matched the shape of the groove 164. In other embodiments, the first joining part 182 can also be configured to have another shape matched the shape of the groove 164, as long as the first joining part 182 can be fitted with and coupled to the groove 164. The second joining part 184 is joined with the side wall 124. In embodiments of the present disclosure, the second joining part 184 has a threaded hole 1842 at an inner side thereof, the side wall 124 has a coupling through-hole 1242 at a position corresponding to the threaded hole 1842, the coupling through-hole 1242 is threaded and the second joining part 184 is coupled to the side wall 124 through a screw 1844. In some embodiments of the present disclosure, the screw 1844 passes through the coupling through-hole 1242 and is screwed into the threaded hole 1842 of the second joining part 184 so as to fasten the second joining part 184 with the side wall 124. In other embodiments, the second joining part 184 can be joined with the side wall 124 by one or a combination of several ones of adhering, screwing, snapping and welding. In some embodiments, the second joining part 184 can be joined with the side wall 124 by selecting an appropriate coupling manner according to practical requirements. The coupling manner between the second joining part 184 and the side wall 124 is not limited herein. An outer wall 188 of the decoration enclosure 18 is configured to have an arc shape. In other embodiments, the outer wall 188 of the decoration enclosure 18 is not limited to having the arc shape, but can also be configured to have other shapes. In some embodiments of the present disclosure, the decoration enclosure 18 surrounds a periphery of the cover plate 16.

In the display screen assembly 10 manufactured by the manufacturing method according to embodiments of the present disclosure, since structures of the bracket 12, the display screen 14, the cover plate 16 and the decoration enclosure 18 of the display screen assembly 10 are designed reasonably, it is possible to assemble the display screen 14 and the cover plate 16 in the electronic device 100 when a peripheral bezel of the electronic device 100 is extremely narrow, thereby solving a problem of assembling difficulties resulted from the extremely narrow bezel of the electronic device 100. Thus, the extremely narrow bezel is achieved, a screen-to-body ratio is increased, and hence the user experience is improved. The display screen assembly 10 and the electronic device 100 according to embodiments of the present disclosure have a simple structure and an easy assembling process, which facilitates improving the production efficiency and saving the production cost.

Further, the decoration enclosure 18 is joined with the cover plate 16 as a whole by in-mold injection molding, and the first joining part 182 is received in the groove 164. This molding manner allows the decoration enclosure 18 to be fitted with cover plate 16 better, and the groove 164 having the stepped shape allows the decoration enclosure 18 to fix the cover plate 16 in the electronic device 100 more stably. Moreover, the first joining part 182 is received in the groove 164 having the stepped shape, so that the first joining part 182 covers part of the black-ink edge of the cover plate 16, thereby reducing a width of the black-ink edge. When the user uses the electronic device 100, the black-ink edge seen by the user is narrower and more artistic, thus improving the user experience.

Reference throughout this specification to "an embodiment", "some embodiments", "an illustrative embodiment", "an example", "a specific example" or "some examples" means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics can be combined in any suitable manner in one or more embodiments or examples.

In addition, terms such as "first" and "second" are used herein for purposes of description and are not intended to indicate or imply relative importance or significance. Thus, the feature defined with "first" and "second" can comprise one or more of this feature. In the description of the present disclosure, "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is limited by the claims and its equivalence.

What is claimed is:
1. A display screen assembly, comprising:
   a bracket having a bottom wall and a side wall bending from the bottom wall;

a display screen having a top surface and a bottom surface, the bottom surface of the display screen being provided on the bottom wall of the bracket, and the display screen and the side wall of the bracket being arranged at two opposite sides of the bottom wall of the bracket respectively;

a cover plate having a bottom surface joined with the top surface of the display screen, and the cover plate having a groove at a side wall thereof; and a decoration enclosure comprising a first joining part and a second joining part coupled to each other, the first joining part being received in the groove, and the second joining part being joined to the side wall of the bracket.

2. The display screen assembly according to claim 1, wherein the second joining part is joined with the side wall of the bracket by one or a combination of ones of adhering, screwing, snapping and welding.

3. The display screen assembly according to claim 1, wherein the bottom surface of the cover plate is screen-printed with a black-ink edge, the top surface of the display screen defines a non-display area, and the black-ink edge shields the non-display area.

4. The display screen assembly according to claim 1, wherein the decoration enclosure is joined with the cover plate by means of in-mold injection molding.

5. The display screen assembly according to claim 1, wherein the top surface of the display screen is joined with the bottom surface of the cover plate in a full lamination manner.

6. The display screen assembly according to claim 1, wherein the top surface of the display screen is laminated with the bottom surface of the cover plate through an optically clear adhesive (OCA).

7. The display screen assembly according to claim 1, wherein the bottom surface of the display screen is joined with the bottom wall of the bracket in an adhering manner.

8. The display screen assembly according to claim 1, wherein the cover plate is configured as a touch-screen cover plate.

9. The display screen assembly according to claim 1, wherein an outer surface of the decoration enclosure is configured as an arc surface.

10. An electronic device, comprising a display screen assembly and a rear cover coupled to the display screen assembly, wherein the display assembly comprises:

a bracket having a bottom wall and a side wall bending from the bottom wall;

a display screen having a bottom surface provided on the bottom wall of the bracket, and the display screen and the side wall of the bracket being arranged at two opposite sides of the bottom wall of the bracket respectively;

a cover plate having a bottom surface joined with a top surface of the display screen, and the cover plate having a groove at a side wall thereof; and a decoration enclosure comprising a first joining part received in the groove and a second joining part joined to the side wall of the bracket.

11. The electronic device according to claim 10, wherein the rear cover is snapped with the decoration enclosure.

12. The electronic device according to claim 11, wherein the decoration enclosure is provided with a boss at a side thereof, the rear cover has a groove corresponding to the boss, and the boss is configured to be snapped into the groove of the rear cover to couple the rear cover with the decoration enclosure.

13. The electronic device according to claim 12, wherein the second joining part of the decoration enclosure has a threaded hole at a side of the second jointing part opposite to the boss, the side wall of the bracket has a coupling through-hole corresponding to the threaded hole, and the second joining part is configured to be joined to the side wall of the bracket through a screw passing through the threaded hole and the coupling through-hole.

14. The electronic device according to claim 10, wherein the cover plate is configured as a touch-screen cover plate.

15. The electronic device according to claim 14, wherein the cover plate comprises:

a touch panel having a touch control circuit and configured to achieve a touch operation of the display screen assembly; and a protection cover sheet provided on the touch panel and configured to protect the touch panel from being damaged due to direct touch operations on the touch panel.

16. The electronic device according to claim 10, wherein the top surface of the display screen is joined with the bottom surface of the cover plate in a full lamination manner.

17. The electronic device according to claim 10, wherein the top surface of the display screen is laminated with the bottom surface of the cover plate through an optically clear adhesive (OCA).

18. A manufacturing method for manufacturing the display screen assembly of claim 1, comprising: providing a decoration enclosure, a cover plate, a display screen and a bracket; in-mold injection-molding the decoration enclosure and the cover plate to couple the decoration enclosure to the cover plate fixedly, the cover plate having a groove at a side wall thereof, the decoration enclosure comprising a first joining part and a second joining part coupled to each other, and the first joining part being received in the groove; laminating a top surface of the display screen with a bottom surface of the cover plate fully; and coupling a side wall of the bracket to the decoration enclosure fixedly, and arranging a bottom wall of the bracket under the display screen.

19. The manufacturing method according to claim 18, wherein the top surface of the display screen is laminated with the bottom surface of the cover plate through an optically clear adhesive (OCA).

20. The manufacturing method according to claim 18, wherein the side wall of the bracket is joined with the decoration enclosure by one or a combination of ones of adhering, screwing, snapping and welding.

* * * * *